United States Patent [19]
Alperovich

[11] Patent Number: 5,832,382
[45] Date of Patent: Nov. 3, 1998

[54] OPTIMIZED ROUTING OF MOBILE CALLS WITHIN A TELECOMMUNICATIONS NETWORK

[75] Inventor: Vladimir Alperovich, Dallas, Tex.

[73] Assignee: Ericsson Inc., Research Triangle Park, N.C.

[21] Appl. No.: 710,346

[22] Filed: Sep. 16, 1996

[51] Int. Cl.[6] .............................. H04M 11/00; H04Q 7/22
[52] U.S. Cl. ........................ 455/433; 455/435; 455/445
[58] Field of Search .................................. 455/422, 428, 455/432, 433, 434, 435, 436, 455, 456, 445, 417, 466

[56] References Cited

U.S. PATENT DOCUMENTS

| | | | |
|---|---|---|---|
| 4,833,701 | 5/1989 | Comroe et al. | 379/60 |
| 4,901,340 | 2/1990 | Parker et al. | 379/60 |
| 5,018,187 | 5/1991 | Marinho et al. | 379/60 |
| 5,153,902 | 10/1992 | Buhl et al. | 379/57 |
| 5,210,787 | 5/1993 | Hayes et al. | 379/60 |
| 5,282,240 | 1/1994 | Buhl et al. | 379/59 |
| 5,325,362 | 6/1994 | Aziz | 370/94.3 |
| 5,345,498 | 9/1994 | Mauger | 379/58 |
| 5,353,340 | 10/1994 | Kunz | 379/60 |
| 5,400,390 | 3/1995 | Salin | 379/59 |
| 5,423,068 | 6/1995 | Hecker | 455/56.1 |
| 5,432,841 | 7/1995 | Rimer | 379/59 |
| 5,440,614 | 8/1995 | Sonberg et al. | 379/60 |
| 5,454,027 | 9/1995 | Kennedy et al. | 379/60 |
| 5,467,381 | 11/1995 | Peltonen et al. | 379/58 |
| 5,497,412 | 3/1996 | Lannen et al. | 379/60 |
| 5,504,804 | 4/1996 | Widmark et al. | 379/63 |
| 5,506,888 | 4/1996 | Hayes et al. | 379/59 |
| 5,526,400 | 6/1996 | Nguyen | 379/59 |
| 5,533,026 | 7/1996 | Ahmadi et al. | 370/94.1 |
| 5,619,552 | 4/1997 | Karppanen et al. | 379/60 |
| 5,724,658 | 8/1995 | Hasan | 455/445 |
| 5,745,852 | 7/1995 | Khan et al. | 455/433 |
| 5,761,620 | 2/1993 | Furuya et al. | 455/435 |

FOREIGN PATENT DOCUMENTS

| | | |
|---|---|---|
| WO 94/05129 | 3/1994 | WIPO . |
| WO 95/09514 | 4/1995 | WIPO . |
| WO 95/33326 | 12/1995 | WIPO . |

OTHER PUBLICATIONS

PCT International Search Report, Mar. 3, 1998, File No. PCT US 97/16478.

*Primary Examiner*—Reinhard J. Eisenzopf
*Assistant Examiner*—Duc M. Nguyen
*Attorney, Agent, or Firm*—Jenkens & Gilchrist

[57] ABSTRACT

After an initial call connection towards a called party mobile station, an originating exchange serving the calling party terminal receives an indication over the connected telecommunications network that the entered called party number is associated with a mobile station. Thereinafter, the serving originating exchange interrogates the HLR directly to determine the mobile switching center (MSC) currently serving the called party mobile station for subsequent outgoing call connection requests towards the called party terminal. After retrieving the roaming number representing the serving MSC for the called party mobile station, a direct call connection is established between the originating exchange and the MSC currently serving the calling party mobile station without establishing a trunk call connection back to the home Public Land Mobile Network (PLMN) associated with the calling party mobile station.

34 Claims, 8 Drawing Sheets

OPTIMIZED ROUTING OF MOBILE CALLS WITHIN A TELECOMMUNICATIONS NETWORK

CROSS REFERENCE TO RELATED APPLICATIONS

This application is related to U.S. patent application Ser. No. filed 08/710349, filed Sep. 16, 1996, entitled "Optimized Routing Of Calls To Roaming Subscribers Within A Telecommunications Network" (Docket No. 27943/100), to U.S. patent application Ser. No. 08/710347, filed Sep. 16, 1996, entitled "Optimized Routing Of Terminating Calls Within A Mobile Telecommunications Network" (Docket No. 27943/98), and to U.S. patent application Ser. No. 08/710345, filed Sep. 11, 1996, entitled "Using Local Number Portability Database To Solve Call Tromboning" (Docket No. 27943/101), all filed concurrently herewith and the contents of such applications are incorporated by reference herein.

BACKGROUND OF THE INVENTION

1. Technical Field of the Invention

The present invention relates to a telecommunications network and, in particular, to the optimal routing of terminating calls towards roaming mobile subscribers within a telecommunications network.

2. Description of Related Art

With the advent and development of mobile telecommunications systems, telecommunications users are no longer physically bound to wireline terminals or fixed locations for telecommunications network communications. Using the added capabilities of roaming and interoffice handoffs, mobile subscribers may travel between multiple Public Land Mobile Networks (PLMNs) utilizing the same telephone number and the same mobile station to originate outgoing calls and to receive incoming calls. Thus, a mobile subscriber may access telecommunications service from multiple locations utilizing multiple service providers with any incurred fees being charged to a single subscription. Furthermore, calling parties do not necessarily have to know where the mobile subscriber is physically located in order to establish a call connection. Data signals between visitor location registers (VLRs) and a home location register (HLR) automatically update and store subscriber information, in particular subscriber location information, enabling the network to reroute incoming calls to the appropriate mobile switching center (MSC) serving the roaming mobile subscriber. Furthermore, regardless of which MSC is currently serving the mobile station, the VLR associated with the serving MSC communicates with the HLR assigned to the mobile station to retrieve the requisite subscriber data, including subscriber feature data and billing data, and provides uniform mobile service to the mobile station.

Conventionally, if a mobile station associated with a New York (N.Y.) mobile telecommunications network is traveling in Los Angeles (L.A.), an incoming call towards the roaming mobile station is first routed to the gateway mobile switching center (GMSC) serving the N.Y. public land mobile network (PLMN) associated with the mobile station. Thereinafter, the N.Y. GMSC performs an interrogation with the home location register (HLR) associated with the mobile station to determine the current location of the roaming mobile station. Upon determining the identity of the L.A. mobile switching center (MSC) currently serving the N.Y. mobile station, the received incoming call is rerouted by the N.Y. GMSC to the serving L.A. MSC to enable a speech connection between the calling party terminal and the roaming mobile station.

Accordingly, if the calling party is originating a call setup signal from L.A., a first trunk call connection between the L.A. telecommunications network and the GMSC serving the home PLMN is initially established and then a second trunk call connection between the GMSC back to the L.A. MSC currently serving the mobile station is established. As a result, a "tromboning" of trunk call connections through N.Y. is performed in order to establish a call connection between the two telecommunications subscribers both located in L.A.

Such "tromboning" trunk call connections are disadvantageous for a number of reasons. First, unnecessary trunk connections have to be established and maintained in order to enable two subscribers who are locally located to communicate with each other and result in unnecessary seizure of valuable network resources. Additionally, even though the called party mobile station is receiving an incoming call from a calling party terminal located within the same local access transport area (LATA), such as L.A., the called party mobile station has to incur long distance charges for forwarding the call connection from his or her home PLMN back to the visited PLMN. Furthermore, the calling party also has to incur long distance charges to N.Y. for calling another mobile station located within the same PLMN.

Accordingly, there is a need for a mechanism to enable the serving mobile telecommunications network to perform optimal routing of a mobile call towards a roaming mobile station.

SUMMARY OF THE INVENTION

The present invention discloses a method and system for optimally routing a call connection within a mobile telecommunications network. A calling party terminal requests a first outgoing call connection towards the mobile station associated with a particular directory number. Following the establishment of a first call connection via a gateway mobile switching center (GMSC) serving the home Public Land Mobile Network (PLMN) associated with the called party mobile station, a backward Integrated Service Digital Network (ISDN) User Part (ISUP) signal is received by the originating telecommunications node associated with the calling party terminal. The backward ISUP signal informs the originating telecommunications node that a call has been established with a mobile station. When the calling party terminal is a mobile station, data indicating that the dialed directory number is a mobile station are transmitted to the calling party mobile station and stored in its internal memory register. On the other hand, when the calling party terminal is a wireline terminal, data indicating that the dialed directory number is a mobile station are stored at the wireline local exchange serving the calling party terminal.

Thereinafter, whenever a subsequent outgoing call connection request towards the same called party mobile sation is received from the calling party terminal, the originating telecommunications node (i.e., wireline local exchange or originating MSC) realizes that the call has been dialed to a mobile station and interrogates the home location register (HLR) associated with that dialed called party mobile station to determine the MSC currently serving the called party mobile station. The originating telecommunications node then directly routes the call setup signal to the determined MSC to establish a call connection between the calling party terminal and calling party mobile station.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
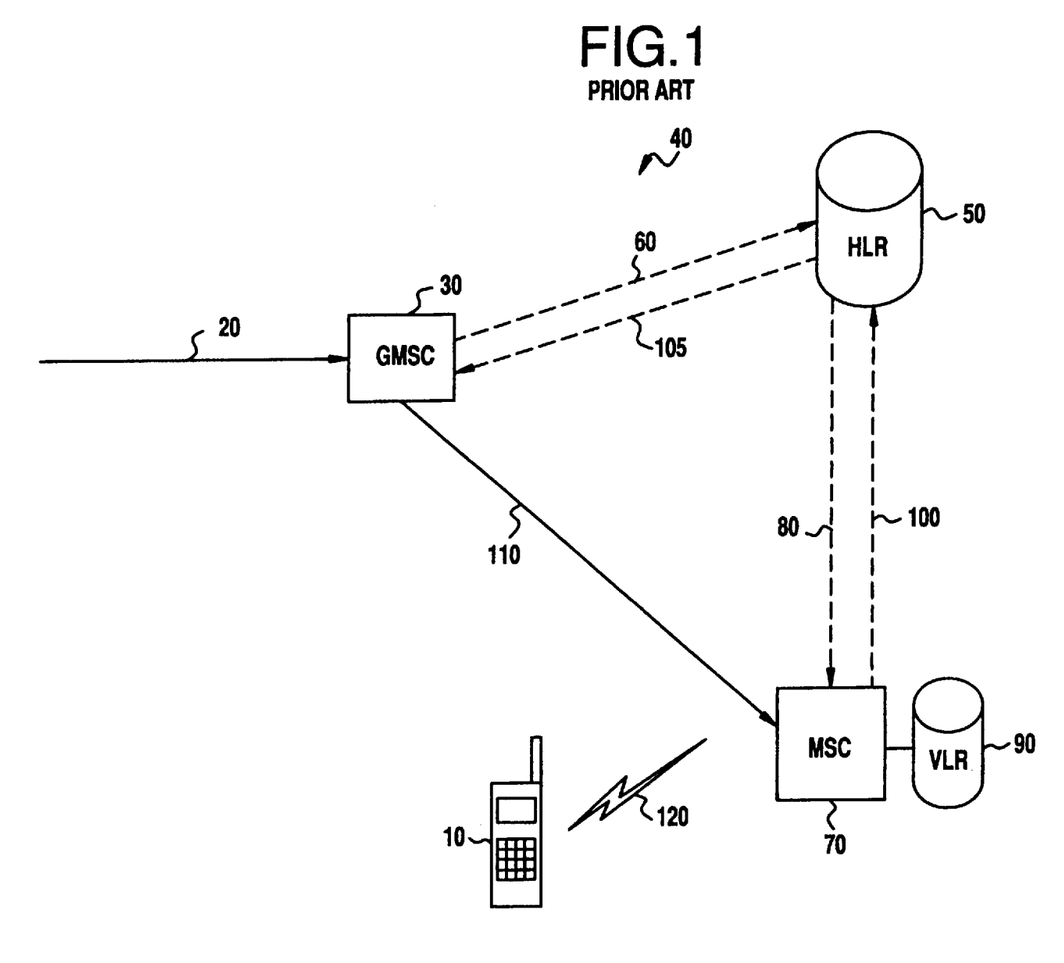
FIG. 1 is a block diagram of a mobile telecommunications network illustrating the routing of an incoming call to a destination mobile station.

FIG. 1 is a block diagram of a telecommunications network illustrating a mobile telecommunications network routing an incoming call to a destination mobile station 10. Whenever a telecommunications subscriber (mobile or wireline) originates a call connection by dialing a directory number, such as a Mobile Subscriber Integrated Service Digital Network (MSISDN) number, associated with the mobile station 10, a call setup signal 20, such as an Initial Address Message (IAM), is received by the gateway mobile switching center (GMSC) 30 serving the public land mobile network (PLMN) 40 associated with the destination mobile station 10. Whenever the IAM signal 20 is received by a particular telecommunications node, such as the GMSC 30, a corresponding call connection (i.e., trunk call connection) is further established between the originating telecommunications node and the receiving telecommunications node.

Because the mobile station 10 is not restricted to one particular location or PLMN, the GMSC 30 receiving the IAM signal needs to interrogate the home location register (HLR) 50 associated with the mobile station 10 to determine the current location of the mobile station 10. Accordingly, a signal 60 requesting routing instruction is transmitted from the GMSC 30 to the HLR 50. The HLR, in turn, determines the identity of the mobile switching center (MSC) 70 currently serving the mobile station 20 and further transmits a signal 80 requesting a roaming number to the identified MSC 70. With the help of subscriber data stored at an attached visitor location register (VLR) 90, the serving MSC 70 identifies the called mobile station 10 traveling within its coverage area and, as a result, returns the roaming number representing the called mobile station located within the serving MSC 70 to the HLR 50 (signal 100). The HLR 50 then forwards the received roaming number back to the GMSC 30 (signal 105). By utilizing the received roaming number identifying the serving MSC 70, the GMSC 30 reroutes the received call setup signal 20 to the serving MSC 70. Accordingly, a call connection 110, such as a trunk connection, is established from the GMSC 30 to the serving MSC 70. Once the rerouted call setup signal is received by the serving MSC 70, the mobile station 10 is paged and a call connection 120 over a radio channel between the mobile station 10 and the serving MSC 70 is established.

Figure 2:
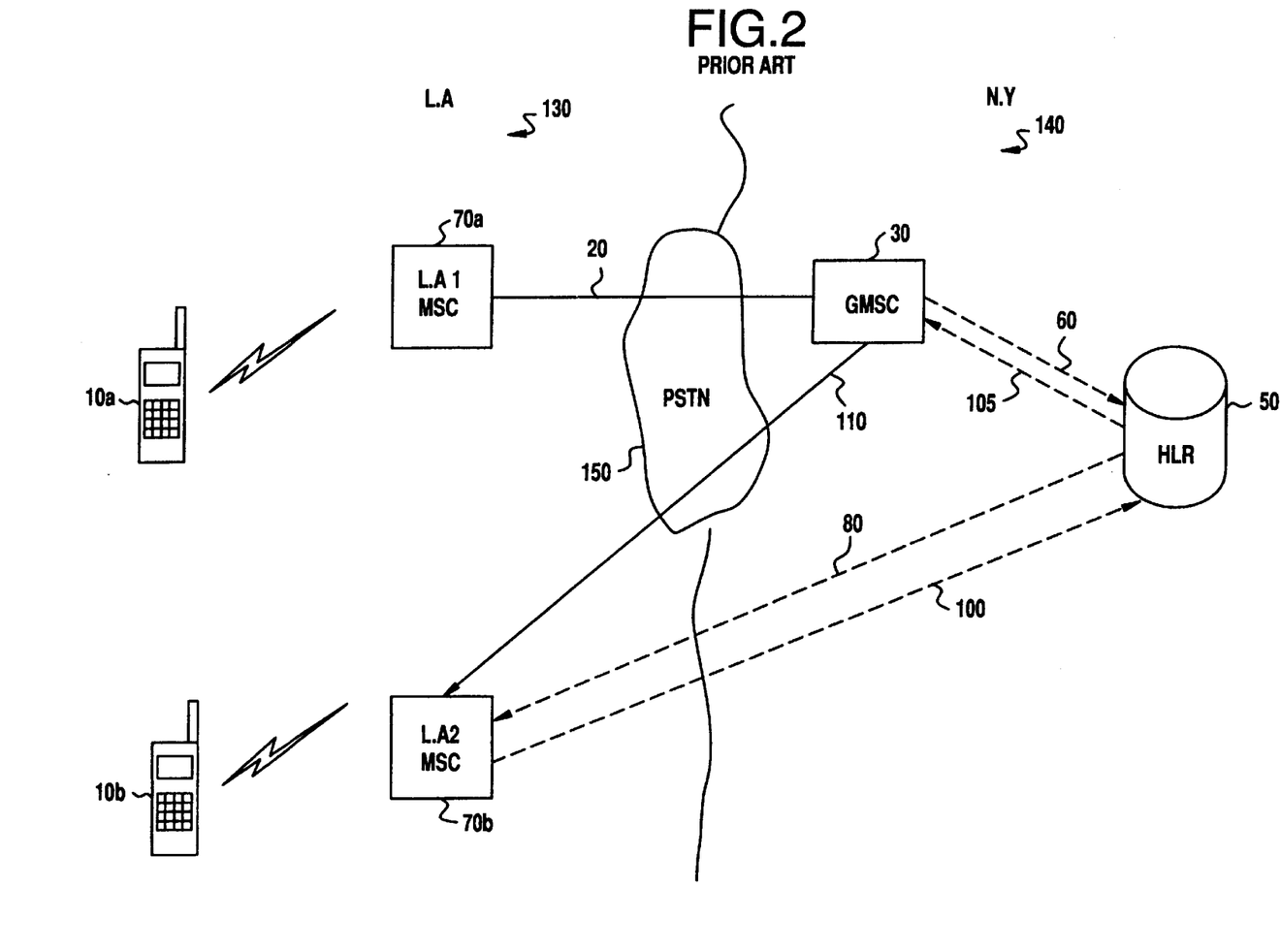
FIG. 2 is a block diagram of a telecommunications network illustrating the tromboning of trunk connections to establish a call connection between a calling party terminal and a roaming called party mobile station.

Due to such HLR interrogation and rerouting of the incoming call by a serving GMSC, inefficient and wasteful call connections are often times established towards a roaming mobile station. Reference is now made to FIG. 2 illustrating the "tromboning" of trunk connections within a telecommunications network to establish a call connection between a calling party terminal 10a and a roaming called party mobile station 10b. The called party mobile station 10b is associated with the N.Y. PLMN 140 and is currently roaming within the visited L.A. PLMN 130. When the mobile station 10a, also located within the L.A. PLMN 130, originates an outgoing call connection towards the called party mobile station 10b, a call setup signal is originated by the L.A. MSC 70a serving the calling party mobile station 10a. The originated call setup signal, such as an IAM signal, is then routed through the connected Public Switched Telephone Network (PSTN) 150 and delivered to the GMSC 30 serving the N.Y. PLMN 140. Accordingly, a first trunk call connection, as illustrated by a solid line 20, is established between the first L.A. MSC 70a and the GMSC 30. As described above in connection with FIG. 1, the GMSC 30 then performs HLR interrogation by transmitting a connection-less signal 60 towards the HLR 50. In order to retrieve a network number that can be utilized by the GMSC 20 to reroute the incoming call, the HLR 50 requests a roaming number from the serving MSC 70b. Because the MSC 70b serving the called party mobile station 10b is another MSC located within the L.A. PLMN 130 (hereinafter called the second L.A. MSC 70b), a Mobile Application Part (MAP) based signal 80 is sent from the N.Y. HLR 50 to the second L.A. MSC 70b. The second L.A. MSC 70b then returns the roaming number back to the HLR 50 via another MAP based signal 100. The received MAP based signal is then transmitted back to the GMSC 30 via signal 105. Utilizing the received roaming number identifying the second L.A. MSC 70b as the MSC currently serving the mobile station 10b, the GMSC 30 reroutes the call setup signal to the second L.A. MSC 70b. Such a rerouting creates a second trunk call connection 110 between the GMSC 30 and the second L.A. MSC 70b.

A speech connection between the calling party mobile station. 10a in Los Angeles and the called party mobile station 10b also in Los Angeles, via the New York GMSC 30, is thus established using the first call connection 20 and the second call connection 110. Such a "tromboning" of trunk call connections is conventionally unavoidable because the current location of the called party mobile station 10b cannot be determined until the call setup signal reaches the GMSC 30. Unfortunately, tromboning of trunk call connections are wasteful and inefficient. It further forces mobile subscribers to incur additional fees for rerouting incoming calls from their home PLMN to the visited PLMN. Furthermore, it forces calling parties to incur unnecessary long distance charges.

Figure 3:
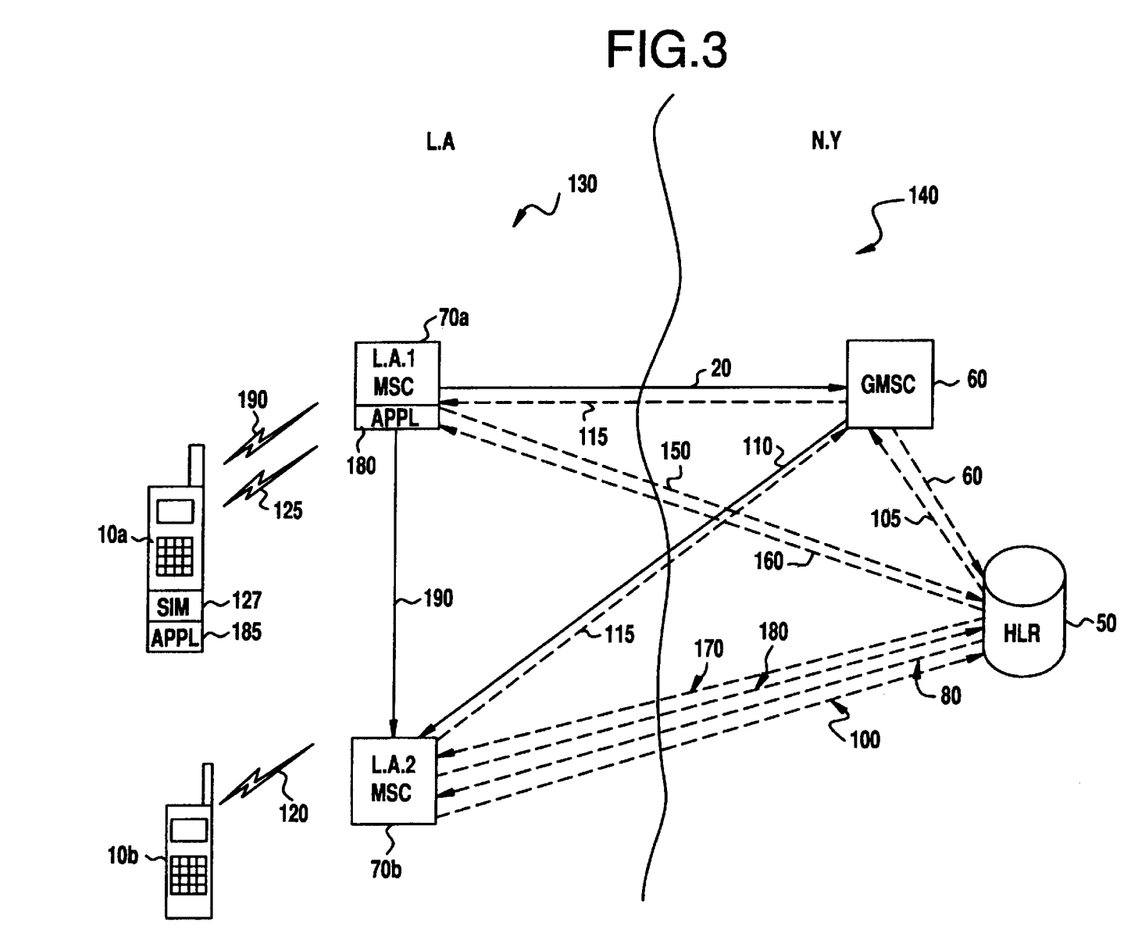
FIG. 3 is a block diagram of a mobile telecommunications network illustrating the optimal routing of a call connection by an originating mobile switching center (MSC)
Figure 4:
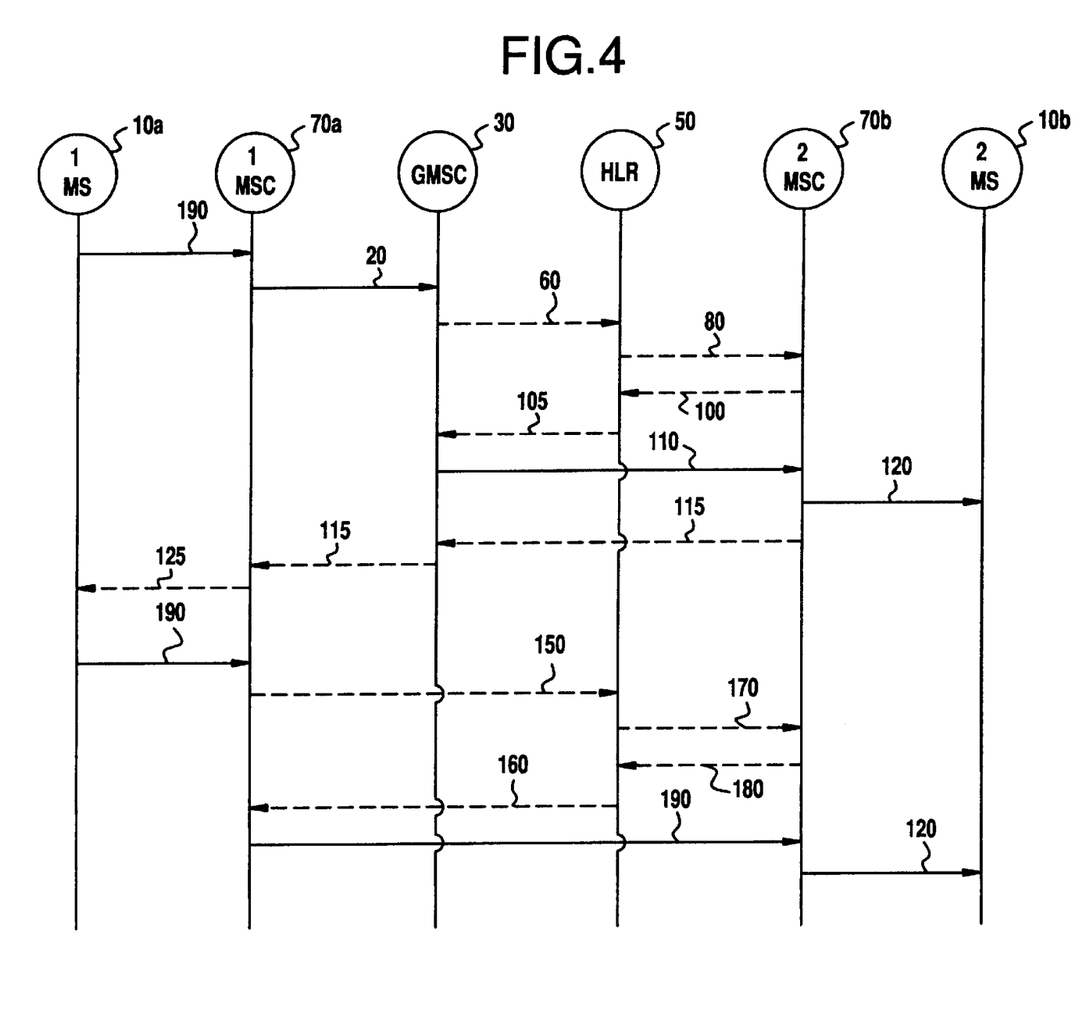
FIG. 4 is a signal sequence diagram illustrating the optimal routing of a call connection by an originating MSC within a mobile telecommunications network.

Reference is now made to both FIGS. 3 and 4 illustrating the optimized routing of a call connection by an originating mobile switching center (MSC) within a mobile telecommunications network. A called party mobile station 10b is associated with the N.Y. PLMN 140 and is currently traveling within the L.A. PLMN 130. First, the calling party mobile station 10a originates an outgoing call connection towards the called party mobile station 10b by transmitting a call setup signal, such as an IAM, with the directory number representing the called party mobile station 10b. A first call connection 20 is then established between the originating MSC 70a (first MSC) and the GMSC 30 associated with the N.Y. PLMN 140. The GMSC 30 transmits a MAP signal 60 requesting routing instruction to the HLR 50 associated with the calling party mobile station 10b. The HLR 50, in turn, transmits a MAP signal 80 requesting a roaming number from the second MSC 70b currently serving the calling party mobile station 10b. As a result, the second MSC 70b returns the roaming number representing the current location of the calling party mobile station 10b to the HLR 50 via another MAP signal 100. The HLR then returns the received roaming number to the requesting GMSC via another MAP signal 105. The GMSC 30 then reroutes the received call connection to the second MSC 70b as reflected by the received roaming number.

Once the call connection is established with the second MSC 70b serving the calling party mobile station 10b, a backward Integrated Service Digital Network (ISDN) User Part (ISUP) signal 115 over a Signaling System No. 7 (SS7) telecommunications system is transmitted by the second MSC 70b. For example, a Call Progress (CPG) backward signal 115 including backward call indicator parameters is sent in the backwards direction (back to the originating exchange) to provide information regarding charging, status of the called party, and various other forms of information which may be needed to complete processing of a call. An indication is further included in the CPG signal informing the originating exchange that the called party terminal is a mobile station. Another indication further specifies the type of mobile telecommunications standard associated with the called party mobile station. Such a system may include the Advanced Mobile Phone System (AMPS) for analog communications, the Digital Advanced Mobile Phone System (DAMPS) for digital communications, and the Personal Communications System (PCS) for Global Mobile System (GSM) based digital communications. Accordingly, a CPG signal 115 is transmitted from the second MSC 70b to the GMSC 30. The GMSC 30 then forwards the same signal 115 to the originating first MSC 70a. An application module 180 within the first MSC 70a then transmits a signal 125 to the calling party mobile station 10a indicating that the dialed called party directory number is a mobile number. The transmitted signal 125 further includes the mobile telecommunications standard (e.g., AMPS, DAMPS, PCS) associated with the called party directory number. Such a signal 125 communicated between the first MSC 70a and the calling party mobile station 10a includes a Direct Transfer Application Part (DTAP) based signal.

The first MSC 70a does not store such indications internally within one of its own registers because the calling party mobile station may travel out of its current coverage area and travel into a different MSC coverage area. When the calling party mobile station is being served by a new MSC, the new MSC still needs to be informed that the subsequent call connection request to the called party terminal is a mobile terminating call. As a result, the first MSC instead communicates such indications to the calling party mobile station.

The received indications are then correlated with the dialed directory number and stored at a memory register associated with the calling party mobile station. Such a memory register includes a Subscriber Identity Module (SIM) card 127 attached to the calling party mobile station 10a.

Thereinafter, whenever the calling party mobile station 10a originates an outgoing call connection towards the same called party mobile station 10b, regardless of whether the calling party mobile station is being served by the same MSC or not, an application module 185 within the calling party mobile station 10a retrieves the previously stored indications correlated with the called party number and informs the serving MSC that the called party directory number is a mobile number. The calling party mobile station further informs the serving MSC the mobile telecommunications standard associated with the called party directory number. As an illustration, a service code followed by the called party directory number is transmitted by the mobile station 10a to the serving MSC.

In response, the application module 180 associated with the first MSC 70a first determines the mobile telecommunications standard (e.g., AMPS, DAMPS, and PCS) associated with the called party directory number. Since more than one mobile telecommunications standard or network can provide mobile service to a particular geographic area, the application module 180 needs to determine the appropriate network or standard to properly communicate with the necessary telecommunications node associated with the called party directory number. Such a determination further includes the type of Intermediate Standard (e.g., IS-41, IS-136) signal protocol needed to facilitate proper communication with the HLR associated with the called party mobile station. The application module 180 then analyzes the received directory number, such as a Mobile Subscriber Integrated Service Digital Number (MSISDN), and determines the home location register (HLR) located within the N.Y. PLMN 140 and associated with the called party mobile station 10b. Because a series of MSISDN numbers are typically pre-assigned to a particular HLR, by analyzing and utilizing the received MSISDN number as the called party address, a signal can be routed to the HLR associated with that particular MSISDN number. Accordingly, the first MSC 70a transmits a connection-less signal, such as a Mobile Application Part (MAP) based signal 150, directly to the identified HLR 50. The transmitted MAP based signal 150 further includes a network address representing the first MSC 70a as the calling party address.

In a manner similar to the conventional HLR interrogation as described in FIG. 1, the HLR 50 then transmits a signal 170 requesting a roaming number from a second MSC 70b currently serving the called party mobile station 10b. The second MSC 70b then returns the roaming number back to the requesting HLR via signal 180. The HLR 50, not knowing that the interrogation has been performed by another MSC, forwards the received roaming number back to the first MSC 70a by utilizing the calling party address received from the previous MAP based signal 150 as the called party address for another MAP based signal 160. After receiving the roaming number identifying the second MSC 70b currently serving the called party mobile station 10b, the first MSC 70a originates an outgoing call connection 190 directly towards the second MSC 70b using the received roaming number as the called party number. The MSISDN number representing the called party mobile station 10b is further included in the transmitted outgoing IAM signal. Accordingly, a call connection (i.e., trunk call connection) 190 is directly established between the first MSC 70a and the second MSC 70b both located within L.A. The second MSC 70*b*, in turn, pages the called party mobile station 10*b* and establishes a speech connection 120 over a radio connection.

Since communicating connection-less signals, such as MAP based signals, does not tie up valuable network trunk resources, by directly interrogating the HLR associated with the called party mobile station 10*b* by the first MSC 70*a*, a more optimal and efficient trunk call connection 190 can be established between the two locally located mobile stations. Furthermore, for the most optimal case, if both mobile stations are being served by the same MSC, no trunk resource at all is needed to establish the speech connection. After receiving a roaming number from the HLR 50, the first MSC 70*a* determines that the received roaming number represents itself, and internally establishes a call connection with the called party mobile station 10*b* located within its coverage area.

Figure 5:
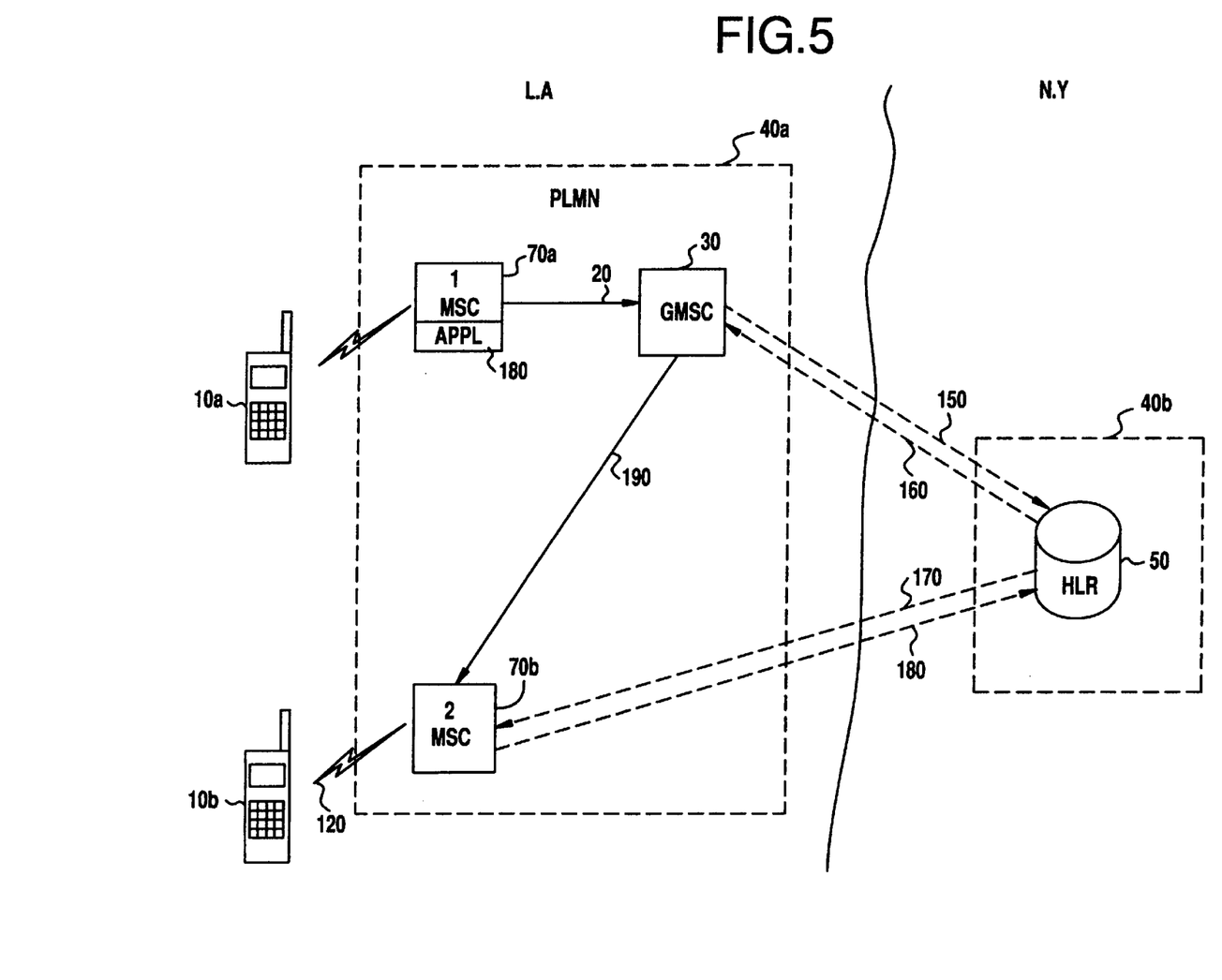
FIG. 5 is a block diagram of a mobile telecommunications network illustrating the optimal routing of a call connection by an gateway mobile switching center (GMSC) associated with the originating MSC.

As another embodiment of the present invention, reference is now made to FIG. 5 illustrating the optimal routing of a call connection by a gateway mobile switching center (GMSC) 30 associated with the first MSC 70*a* serving the calling party mobile station 10*a*. In case the originating MSC 70*a* does not have the capability to interrogate an HLR directly, upon receiving an indication from the calling party mobile station 10*a* and determining that the received directory number represents a mobile station, the application module 180 within the first MSC 70*a* originates an outgoing call connection 20 to the nearest GMSC, e.g., L.A. GMSC 30, serving the same LATA. The L.A. GMSC 30, in turn, interrogates the HLR 50 associated with the called party mobile station 10*b* and located within the N.Y. PLMN 40*b*. The HLR 50, in turn, sends another connection-less signal 170 to the second MSC 70*b* currently serving the called party mobile station 10*b* requesting a roaming number. The roaming number is transmitted by the second MSC 70*b* back to the HLR 50 via another connection-less signal 180. The HLR 50 then forwards the received roaming number to the L.A. GMSC 30 via yet another connection-less signal 160. The L.A. GMSC 30 then reroutes the call connection directly to the second MSC 40*b* identified by the received roaming number and establishes a trunk call connection 190 between the GMSC 30 and the second MSC 70*b*. The second MSC 70*b* then pages the called party mobile station 10*b* and establishes a speech connection 120.

If both MSCs are associated with the same PLMN, no long distance charges are incurred by the parties to establish a local call connection. If the called party mobile station is traveling within a different PLMN, a long distance charge would be lower than the "tromboning" call connection charge. Lastly, for the most optimal case, if both mobile stations 10*a*–10*b* are being served by the same MSC, the GMSC 30 reroutes the call connection back to the first MSC 70*a* to enable the first MSC 70*a* to internally switch the call connection and to establish a speech connection with the called party mobile station 10*b* traveling within its coverage area.

Figure 6:
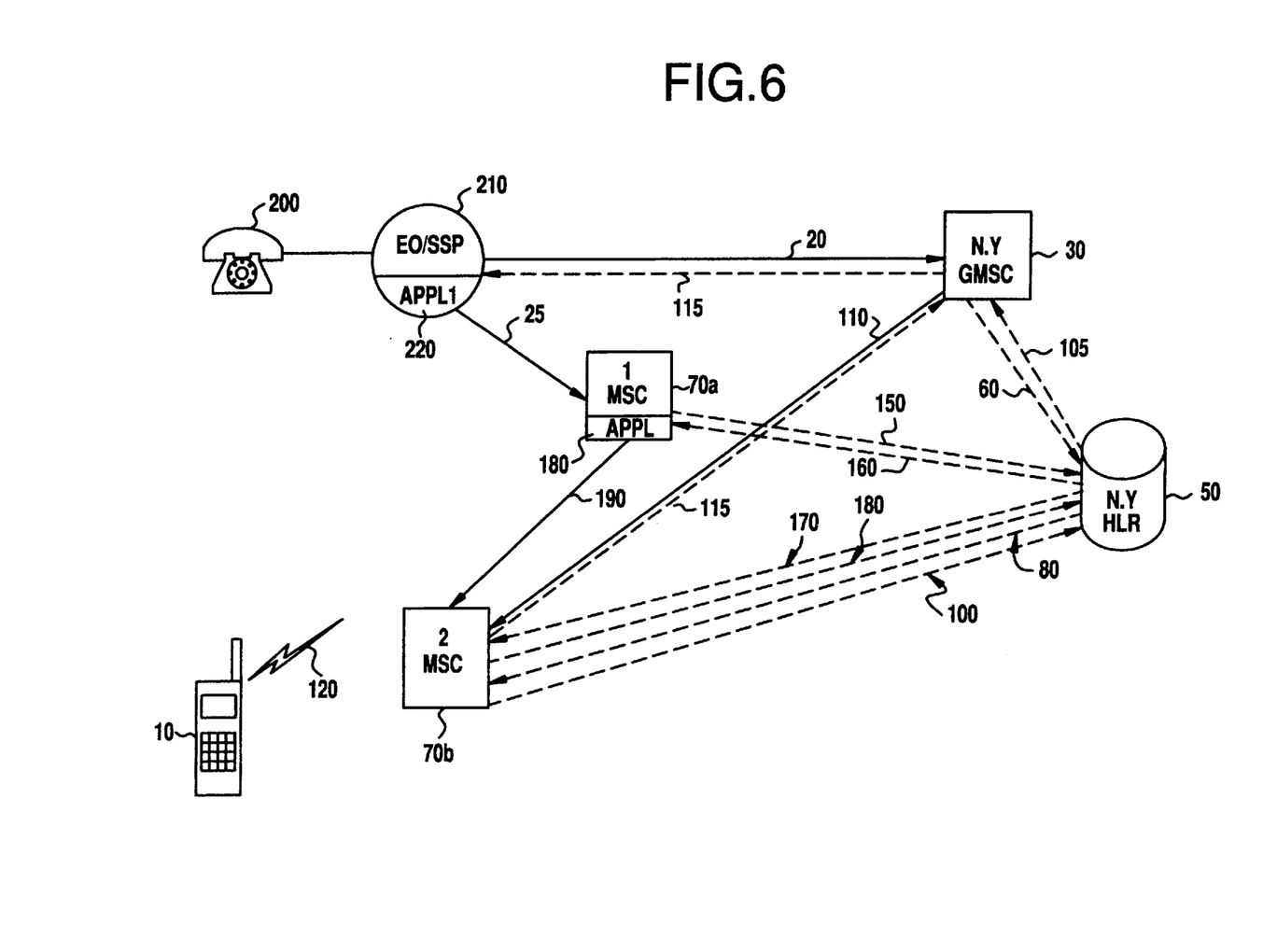
FIG. 6 is a block diagram of a telecommunications network illustrating the optimal routing of a call connection by a MSC associated with a wireline local exchange connected to the calling party terminal.
Figure 7:
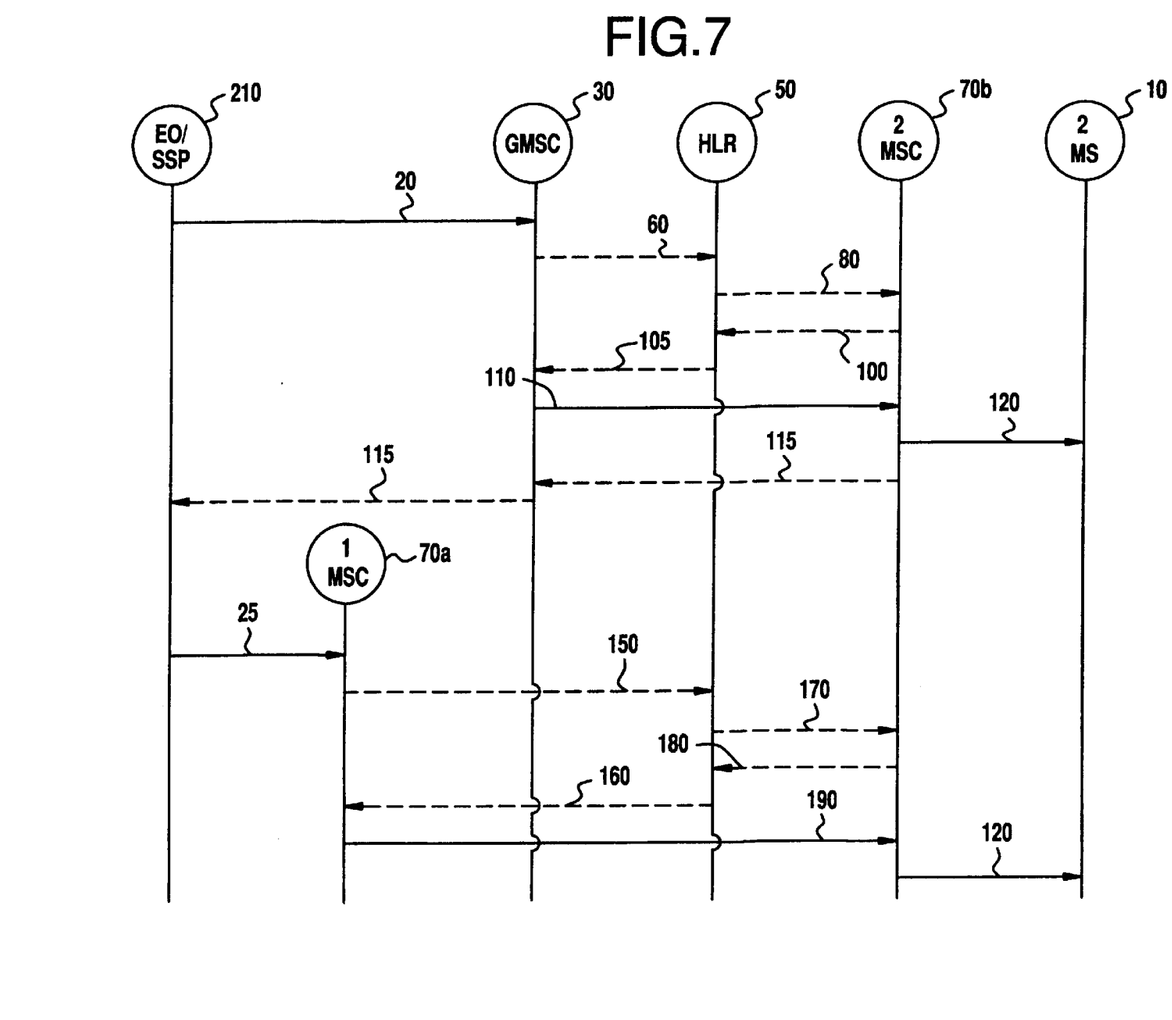
FIG. 7 is a signal sequence diagram illustrating the optimal routing of a call connection by a MSC associated with a wireline local exchange connected to the calling party terminal within a telecommunications network.

Reference is now made to both FIGS. 6 and 7 illustrating the optimal routing of a call connection by an MSC associated with a wireline local exchange connected to the calling party terminal. A wireline terminal 200 connected to a wireline local exchange 210 located within a L.A. Public Switched Telephone Network (PSTN) requests a call connection towards a called party mobile station 10 by dialing a directory number representing the mobile station 10. The wireline local exchange includes a conventional end office. It may also be a Service Switching Point (SSP) within an Intelligent Network (IN).

Initially, not knowing that the dialed directory number is associated with a mobile station, a call setup signal is transmitted over the connected Signaling System No. 7 (SS7) telecommunications network connected to the serving PSTN. In accordance with the conventional routing mechanism, the IAM signal is routed to the GMSC 30 serving the home PLMN associated with the called party mobile station 10. As a result, a trunk call connection 20 is established between the wireline local exchange 210 and the GMSC 30.

In a manner similar to the HLR interrogation as described above, MAP signals between GMSC, HLR and the serving MSC 70*b* are then communicated to acquire a roaming number representing the serving MSC 70*b* by the GMSC 30 (MAP signals 60, 80, 100, and 105 respectively). Utilizing the received roaming number, the GMSC 30 reroutes the call connection to the serving MSC 70*b* and establishes a call connection 110 between the GMSC 30 and the serving MSC 70*b*. After the completion of the call connection 110, a backward ISUP signal 115, such as a Call Progress (CPG) signal, is transmitted from the serving MSC 70*b* back to the GMSC 30. The GMSC 30, in turn, transmits the CPG signal 115 back to the originating wireline local exchange 210 informing the originating exchange that the called party is associated with a mobile station. As described above, the received backward CPG signal 115 further indicates the mobile telecommunications standard associated with the called party mobile station. An application module 220 associated with the wireline local exchange 210 then stores data at its internal memory register indicating that the called party directory number is a mobile number and the mobile telecommunications standard (e.g., AMPS, DAMPS, and PCS) associated with the called party directory number.

Thereinafter, whenever the calling party wireline terminal 200 requests an outgoing call connection towards the same called party mobile station 10, the application module 220 retrieves the previously stored data and determines that the dialed called party directory number is a mobile number. In response, the application module 220 originates a call connection towards a first mobile switching center 70*a* located within the same LATA, such as the L.A. PLMN. Since a wireline local exchange does not usually have any MAP capabilities, the HLR interrogation has to be performed by one of the mobile telecommunications nodes located close to the originating wireline local exchange. One of the optional parameters, such as a Generic Address Parameter (GAP), within the call setup signal further specifies the mobile telecommunications standard associated with the called party directory number.

After receiving the call connection 25 from the local exchange 210, an application module 180 within the first MSC 70*a* determines that it is an "optimized" call being initiated by a neighboring wireline local exchange 210, and identifies the mobile telecommunications standard associated with the called party directory number. After determining the appropriate signaling protocol (e.g., IS-41 and IS-136) to be used, the first MSC 70*a* transmits a connection-less signal 150 towards the HLR 50 associated with the received MSISDN number and located within the N.Y. PLMN. The HLR 50 located within the N.Y. PLMN then transmits a connection-less signal 170 towards a second MSC 70*b* currently serving the called party mobile station 10. The requested roaming number is transmitted back to the HLR (signal 180) and accordingly forwarded to the first MSC 70*a* (signal 160). Utilizing the received roaming number identifying the second MSC 70*b* currently serving the called party mobile station 10, the first MSC 70*a* forwards the received call setup signal, such as an IAM signal, to the indicated second MSC 70*b*. Accordingly, a trunk call connection 190 is established between the first MSC 70*a* and the second MSC 70*b*. The second MSC 70*b* then establishes a speech connection 120 with the called party mobile station 10 located within its coverage area.

Again, the first and second MSC could be located within the same PLMN or located separately within two different PLMNs. Furthermore, the called party mobile station might be served by the first MSC 70*a* receiving the call setup signal from the wireline local exchange 210.

Figure 8:
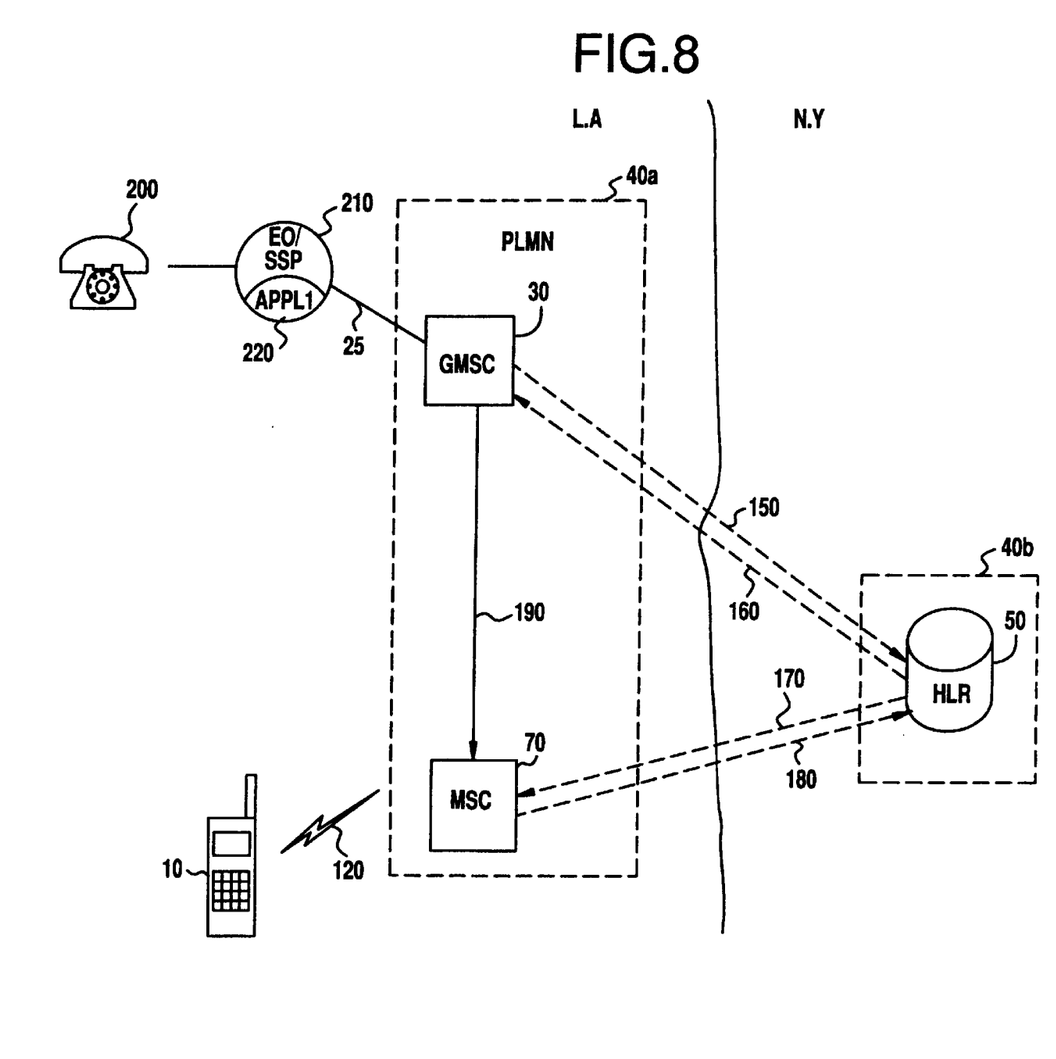
FIG. 8 is a block diagram of a telecommunications network illustrating the optimal routing of a call connection by a gateway mobile switching center (GMSC) associated with a wireline local exchange connected to the calling party terminal.

As another embodiment of the present invention, reference is now made to FIG. 8 illustrating the optimal routing of a call connection by a GMSC associated with a wireline local exchange connected to the calling party terminal. After retrieving the data correlated with the calling party terminal and upon determining that the directory number specified by the wireline terminal 200 is a mobile number, the application module 220 within the local exchange 210 originates a call setup signal towards a GMSC 30 associated with a PLMN 40*a* located within the same LATA, e.g., L.A. PLMN. As a result, a trunk connection 25 is established between the local exchange 210 and the L.A. GMSC 30. In a manner similar to the HLR interrogation by the MSC as described in FIG. 6, the L.A. GMSC 30 located within the L.A. PLMN 40*a* identifies the appropriate mobile telecommunications standard associated with the called party mobile station and sends a connection-less signal 150 to the HLR 50 located within the N.Y. PLMN 40*b* requesting routing instruction. The HLR 50 then communicates with MSC 70 currently serving the called party mobile station 10 to acquire a roaming number (signals 170 and 180) and forwards the acquired roaming number to the L.A. GMSC 30 (signal 160). The L.A. GMSC 30 then reroutes the received call setup signal utilizing the received roaming number as the called party address. As a result, a trunk call connection 190 is established between the L.A. GMSC 30 and the serving MSC 70. The serving MSC 70 then establishes a speech connection 120 with the called party mobile station 10.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for optimally establishing a call connection to a mobile station within a telecommunications network, said method comprising the steps of:

establishing a first connection from a first telecommunications node serving a calling party mobile station to a called party terminal associated with a dialed called party number;

in response to said first connection, receiving a first indication at said first telecommunications node that said called party number is a mobile number;

informing said calling party mobile station that said dialed called party number is a mobile number;

receiving a request from said calling party mobile station at a second telecommunications node currently serving said calling party mobile station to establish a call connection towards said called party terminal, said request further including a second indication indicating that said called party terminal is a mobile station;

communicating with a home mobile telecommunications network associated with said called party terminal to receive a routing instruction; and establishing said second call connection with said called party terminal in accordance with said routing instruction.

2. The method of claim 1 wherein said first and second telecommunications nodes are mobile switching centers (MSCs) serving said calling party mobile station.

3. The method of claim 2 wherein said first and second MSCs are the same MSC.

4. The method of claim 1 wherein said first indication comprises an Integrated Service Digital Network User Part (ISUP) based Call Progress (CPG) signal.

5. The method of claim 1 wherein said first indication further comprises data indicating the mobile telecommunications system associated with the called party number.

6. The method of claim 1 wherein said step of informing said calling party mobile station further comprises the step of storing data at said calling party mobile station indicating that said called party terminal is a mobile station.

7. The method of claim 1 wherein said second indication comprises a service code indicating that said called party terminal is a mobile station.

8. The method of claim 1 wherein said step of communicating with said home telecommunications network further comprises the step of performing interrogation with a home location register (HLR) associated with said called party terminal and wherein said routing instruction comprises a roaming number representing a mobile switching center (MSC) currently serving said called party terminal.

9. The method of claim 8 wherein said step of performing interrogation with said HLR is performed by a gateway mobile switching center (GMSC) associated with said first telecommunications node.

10. A method for optimally establishing a call connection to a mobile station within a telecommunications network, said method comprising the steps of:

establishing a first connection from a telecommunications node serving a calling party terminal to a called party terminal associated with a dialed called party number;

in response to said first connection, receiving a first indication at said telecommunications node that said called party number is a mobile number;

storing data at said telecommunications node indicating that said called party number is a mobile number;

receiving a request from said calling party terminal to originate a second call connection towards said called party number;

determining that said called party number is a mobile number by evaluating said stored data;

communicating with a home mobile telecommunications network associated with said called party terminal to receive a routing instruction; and establishing said second call connection with said called party terminal in accordance with said routing instruction.

11. The method of claim 10 wherein said telecommunications node comprises a wireline local exchange.

12. The method of claim 10 wherein said first indication comprises an Integrated Service Digital Network User Part (ISUP) based Call Progress (CPG) signal.

13. The method of claim 10 wherein said first indication further comprises data indicating the mobile telecommunications standard associated with the called party number.

14. The method of claim 10 wherein said step of communicating with said home telecommunications network further comprises the step of performing interrogation with a home location register (HLR) associated with said called party terminal and wherein said routing instruction comprises a roaming number representing a mobile switching center (MSC) currently serving said called party terminal.

15. The method of claim 14 wherein said step of performing interrogation with said HLR is performed by a gateway mobile switching center (GMSC) associated with said telecommunications node.

16. A method for establishing a call connection towards a mobile station within a telecommunications network, said method comprising the steps of:

transmitting a first request from a mobile station to a first serving mobile switching center (MSC) to establish a first call connection with a particular called party number;

receiving a first indication from said serving mobile switching center that said called party number is associated with a mobile station;

storing data indicating that said called party number is a mobile number at said mobile station; and receiving a request from a subscriber associated with said mobile station to originate a call connection towards said called party number;

retrieving said stored data for said called party number; and transmitting a second request from said mobile station to a second MSC current serving said mobile station to establish a second call connection with said called party number, said second request further including a second indication that said called party number is a mobile number.

17. The method of claim 16 wherein said first MSC and said second MSC are the same.

18. The method of claim 16 wherein said indication received from said first MSC comprises a Direct Transfer Application Part (DTAP) based progress signal.

19. The method of claim 16 wherein said second indication comprises a service code representing that said called party number is a mobile number.

20. The method of claim 16 wherein said first indication further comprises data specifying the mobile telecommunications standard associated with said called party number.

21. A system for determining that a called party terminal is a mobile station, said system comprising:

means for establishing a first connection from a telecommunications node serving a calling party terminal to a called party terminal associated with a dialed called party number;

means, in response to said first connection, for receiving an indication at said telecommunications node that said called party number is a mobile number; and means for storing data indicating that said called party number is a mobile number.

22. The system of claim 21 wherein said calling party terminal comprises a calling party mobile station and wherein said telecommunications node comprises a mobile switching center (MSC) serving said calling party mobile station.

23. The system of claim 22 wherein said means for storing said data further comprises:

means for informing said calling party mobile station that said called party terminal is a mobile station; and means for storing said data at said calling party mobile station indicating that said called party terminal is a mobile station.

24. The system of claim 23 wherein said means for informing said calling party mobile station comprises a Direct Transfer Application Part (DTAP) based signal.

25. The system of claim 21 wherein said calling party terminal comprises a wireline terminal and wherein said telecommunications node comprises a wireline local exchange serving said calling party terminal.

26. The system of claim 25 wherein said means for storing said data further comprises means for storing said data at said wireline local exchange indicating that said called party terminal is a mobile station.

27. The system of claim 21 wherein said indication comprises an Integrated Service Digital Network User Part (ISUP) based call progress (CPG) signal.

28. A method for determining that a called party terminal is a mobile station within a telecommunications network, said method comprising the steps of:

establishing a first connection from a telecommunications node serving a calling party terminal to a called party terminal associated with a dialed called party number;

in response to said first connection, receiving an indication at said telecommunications node that said called party number is a mobile number; and storing data indicating that said called party number is a mobile number.

29. The method of claim 28 wherein said calling party terminal comprises a calling party mobile station and wherein said telecommunications node comprises a mobile switching center (MSC) serving said calling party mobile station.

30. The method of claim 29 wherein said step of storing said data further comprises the step of:

informing said calling party mobile station that said called party terminal is a mobile station; and storing said data at said calling party mobile station that said called party terminal is a mobile station.

31. The method of claim 30 wherein said step of informing said calling party mobile station comprises the step of communicating a Direct Transfer Application Part (DTAP) based signal to said calling party mobile station.

32. The method of claim 28 wherein said calling party terminal comprises a wireline terminal and wherein said telecommunications node comprises a wireline local exchange serving said calling party terminal.

33. The method of claim 32 wherein said step of storing said data further comprises the step of storing said data at said wireline local exchange indicating that said called party terminal is a mobile station.

34. The method of claim 28 wherein said indication comprises an Integrated Service Digital Network User Part (ISUP) based call progress (CPG) signal.

* * * * *